US011139988B2

(12) United States Patent
Sundar et al.

(10) Patent No.: US 11,139,988 B2
(45) Date of Patent: Oct. 5, 2021

(54) SYSTEM AND METHOD FOR MULTI-CERTIFICATE PINNING

(71) Applicant: JPMorgan Chase Bank, N.A., New York, NY (US)

(72) Inventors: Gayathri Sundar, Irving, TX (US); Jeffrey Hague, Bear, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 243 days.

(21) Appl. No.: 16/433,024

(22) Filed: Jun. 6, 2019

(65) Prior Publication Data
US 2019/0379549 A1 Dec. 12, 2019

Related U.S. Application Data

(60) Provisional application No. 62/682,337, filed on Jun. 8, 2018.

(51) Int. Cl.
| H04L 29/06 | (2006.01) |
| H04L 9/32 | (2006.01) |
| H04L 9/06 | (2006.01) |
| H04W 12/30 | (2021.01) |

(52) U.S. Cl.
CPC .......... *H04L 9/3268* (2013.01); *H04L 9/0643* (2013.01); *H04W 12/30* (2021.01)

(58) Field of Classification Search
CPC . H04L 9/3268; H04L 9/0643; H04L 63/0823; H04L 63/0435; H04L 63/0853; H04L 63/1466; H04W 12/30
See application file for complete search history.

(56) References Cited

U.S. PATENT DOCUMENTS

| 8,726,011 | B1* | 5/2014 | Jarvie | G06Q 50/10 |
| | | | | 713/156 |
| 9,912,486 | B1* | 3/2018 | Sharifi Mehr | H04L 9/321 |
| 2004/0148505 | A1 | 7/2004 | Qiu | |
| 2007/0130439 | A1* | 6/2007 | Andersson | G06F 21/575 |
| | | | | 711/200 |
| 2011/0113239 | A1* | 5/2011 | Fu | H04L 9/3226 |
| | | | | 713/156 |
| 2011/0154017 | A1* | 6/2011 | Edstrom | H04L 67/2819 |
| | | | | 713/151 |

(Continued)

FOREIGN PATENT DOCUMENTS

EP        3232640 A1       10/2017

OTHER PUBLICATIONS

Notification of Transmittal of the International Search Report and The Written Opinion of the International Search Authority dated Aug. 20, 2019 in PCT/US2019/035737.

*Primary Examiner* — Malcolm Cribbs
(74) *Attorney, Agent, or Firm* — Hunton Andrews Kurth LLP

(57) ABSTRACT

An embodiment of the present invention is directed to a multi-certificate pinning. The innovative system configures servers with at least two certificates from multiple different vendors/sources with differing expiration dates. This provides lead time to replace voided/expired certificates. If a first certificate expires, the system uses another valid certificate for that server until the certificated is addressed, thereby avoiding service down times. Accordingly, providers are not required to expedite mobile app store submission.

20 Claims, 3 Drawing Sheets

(56) References Cited

U.S. PATENT DOCUMENTS

| | | |
|---|---|---|
| 2011/0154027 A1 | 6/2011 | Liu et al. |
| 2013/0227275 A1 | 8/2013 | Satoh |
| 2016/0063466 A1* | 3/2016 | Sheridan .......... G06Q 20/38215 |
| | | 705/26.25 |
| 2016/0112409 A1* | 4/2016 | Le ........................ H04W 12/10 |
| | | 713/156 |
| 2017/0171191 A1 | 6/2017 | Cignetti et al. |
| 2017/0230355 A1* | 8/2017 | Su ........................ H04L 63/0823 |
| 2017/0264613 A1* | 9/2017 | Phillips ............... H04L 63/0428 |
| 2019/0068581 A1* | 2/2019 | Yamamoto ............ H04L 63/083 |
| 2019/0165950 A1* | 5/2019 | Ibrahim .................. H04W 4/60 |

* cited by examiner

SYSTEM AND METHOD FOR MULTI-CERTIFICATE PINNING

CROSS REFERENCE TO RELATED APPLICATIONS

The application claims priority to U.S. Provisional Application 62/682,337, filed Jun. 8, 2018, the contents of which are incorporated herein in its entirety.

FIELD OF THE INVENTION

The invention relates generally to a system and method for implementing multi-certificate pinning with multiple certificates having different expiration times.

BACKGROUND OF THE INVENTION

Certificate pinning with a single certificate has issues with respect to outages caused by certificate expirations on servers. The single certificate is often also baked into the mobile application sandbox which requires a repackaging of the mobile app with a new certificate and a resubmission to app stores. When the certificate expires, service may be disrupted until the certificate is renewed. On the server side, certificates need to be renewed on time and overlap properly to avoid outages and disruptions in service.

These and other drawbacks exist.

SUMMARY OF THE INVENTION

According to one embodiment, the invention relates to a mobile device system that implements multi-certificate pinning. A mobile device comprises: a memory component; a network communication interface that is in communication with a remote server such as a content delivery network; and a microprocessor, coupled to the memory component and the network communication interface, the microprocessor configured to perform the steps of: requesting a first certificate and a second certificate from the remote server, wherein the first certificate has a first expiration and the second certificate has a second expiration different from the first expiration; executing an application on the mobile device by using the first certificate to make a connection to the server; and prior to or upon an expiration of the first certificate, switching to the second certificate wherein the application now uses the second certificate to make the connection to the remote server.

According to another embodiment, the invention relates to a mobile device system that implements multi-certificate pinning. A mobile device comprises: a memory component; a network communication interface that is in communication with a remote server such as a content delivery network; and a microprocessor, coupled to the memory component and the network communication interface, the microprocessor configured to perform the steps of: requesting and receiving a first certificate; requesting and receiving a second certificate in advance of an expiration of the first certificate; updating at least one application executing on the mobile device to contain the first certificate and the second certificate; requesting and receiving a third certificate in advance of the expiration of the first certificate; and upon expiration of the first certificate; updating the at least one application executing on the mobile device to contain the second certificate and the third certificate.

According to another embodiment, the invention relates to a method that implements multi-certificate pinning. A method comprises the steps of: requesting a first certificate and a second certificate from a remote server such as a content delivery network, wherein the first certificate has a first expiration and the second certificate has a second expiration different from the first expiration; executing an application on a mobile device by using the first certificate to make a connection to a server; and prior to or upon an expiration of the first certificate, switching to the second certificate wherein the application now uses the second certificate to make the connection to the remote server.

The mobile device may include a specially programmed computer system comprising one or more computer processors, electronic storage devices, and networks.

The computer implemented mobile device system, method and medium described herein provide unique advantages to entities, organizations, mobile device users, application developers and providers, and various other users, according to various embodiments of the invention. The innovative mobile device system mitigates risks by having multiple pins associated with a server. Specifically, a host service may supply the pins to ensure at any given time, there is at least one valid pin stored by a mobile application, including a mobile Software Development Kit (SDK), thus preventing Denial of Service (DOS). The innovative methodology provides sufficient time to update an expired or breached certificate on a remote server such as a Content Delivery Network (CDN) as well as within a SDK/mobile application. If one particular certificate authority (CA) is compromised, having two different CA issued server certificates would immediately suspend a breached certificate, thereby achieving improved resiliency. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to configuring servers with multiple certificates from multiple different vendors/sources with differing expiration dates. According to an embodiment of the present invention, a server may be configured with multiple certificates. For example, a server may be configured with two certificates where each certificate is from a different provider. This provides lead time to replace voided and/or expired certificates as well as address other issues. For example, if a first certificate expires, the system may use another valid certificate for that server until the certificate renewal is addressed, thereby avoiding service down times. Accordingly, providers are not required to expedite mobile app store submission.

Figure 1:
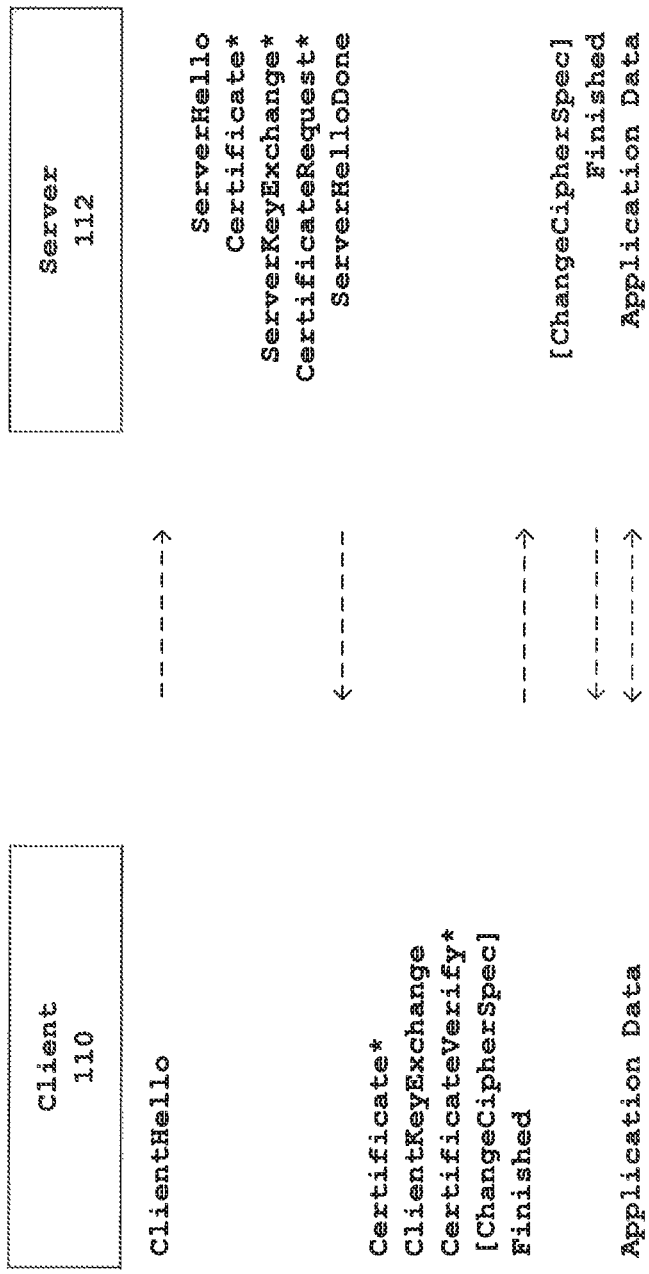
FIG. 1 is an exemplary message flow for a full handshake.

FIG. 1 is an exemplary message flow for a full handshake between Client 110 and Server 112. Transport Layer Security (TLS) may be classified into a TLS handshake protocol and a TLS record protocol. As shown in FIG. 1, there are two parts to securing application data that is going out on the wire/over the air (OTA). An exemplary scenario may use a symmetric cipher (e.g., AES/3DES/RC4, etc.) to encrypt data carried by the TLS record protocol owing to its properties of speed and scalability. In order to achieve this, an authenticated trusted tunnel may be established between two negotiating parties to exchange secrets that would end up deriving the same symmetric keys on both sides, without actually sending it out on the wire/OTA. The TLS Handshake protocol provides this. As part of establishing this trust, asymmetric ciphers, such as RSA, DH and ECC, may be used.

With regards to RSA/DH etc., a key pair may be derived such that given a public counterpart, it would be computationally infeasible to derive its private counterpart given current resource capabilities. Such hurdles may include addressing computationally difficult problems such as factoring of large primes, discrete logarithms, etc. The public key may be broadcast and a corresponding private key may be secured. These algorithms may be designed in a way that the traffic is encrypted with the public key and decrypted with its corresponding private key.

Given this background, the TLS Handshake protocol may mandate server authentication and optionally client authentication. There is an optional third mode called Anonymous TLS, where neither party is authenticated by a trusted certificate. Accordingly, certificate pinning does not apply there.

Because the server certificate is mandated, an embodiment of the present invention may rely on trusting the received certificate which vouches for its public key. Keying material may be exchanged by encrypting the data with a peer's public key. Accordingly, validating the public key as belonging to its owner is crucial in establishing trust as part of the TLS Handshake protocol.

Currently, mobile applications statically pin certificates that are needed to be validated (e.g., service endpoints that they consume, etc.). This is not a truly scalable solution as it requires providers to constantly validate the correctness of these certificates manually prior to release cycles. In addition, current systems require dependency on various third party owned applications which consume SDKs to rollout an update as soon as pins either expire or experience a breach that needs to be quickly acted upon.

An embodiment of the present invention is directed to a dynamic certificate pinning framework to address these concerns where pins are hosted on a site, (e.g., public site) which may be accessible from various environments. For example, pins may be hosted on a CDN, which may be dynamically pulled and updated at run time.

Although this addresses an issue of getting pins on the fly for various servers that are consumed from mobile applications, a first connection to CDN itself may be statically pinned, and again bundled as part of a third party SDK application to ensure Trust on First Use (TOFU). Under this scenario, third party applications have a version of a SDK that could potentially have an expired Static pin of CDN, which would cause a denial of service. For example, some third parties are not willing (or simply fail) to update SDK for long periods of time, e.g., months, years, etc. Oftentimes, terms and conditions with third parties do not force them to upgrade right away but within a period of at least a predetermined number of months (e.g., 6 months, etc.) to take a newer version of the SDK.

An embodiment of the present invention is directed to ensuring enough lead time to update expired certificates and/or change certificates as part of certificate rotation policies and ensure functionality does not break within mobile applications that are in market. An embodiment of the present invention is directed to executing multiple valid certificates on servers such that they are out of sync by a predetermined time period (e.g., few months, weeks, days, etc.) in terms of their validity. This ensures that at any given time, one valid pin is available for any given server.

This certificate pattern is further useful when it comes to Frameworks that may be distributed to third party merchant applications. For example, a provider may depend on vendors updating their application with pins as the provider now may become a third party from their context. In this example, a financial institution may provide frameworks to merchants, e.g., a Mobile Pay SDK, which has pins baked into it for requesting banking and payment services. This may be abstracted from a Merchant perspective. In addition, different certificate authorities (CAs) issuing different certificates to the same server may further provide improved resiliency. Within the context of the various features of an embodiment of the present invention, pins and certificates may be used interchangeably.

An embodiment of the present invention is directed to preventing denial of service (DOS) based on pins expiration where the system is ensured to have at least one valid pin in operation. The system further avoids the need to push for new SDK versions to already integrated third parties as the CDN itself may host its own new pins, which may be fetched using the other valid pin and overwritten within the SDK. The system further effectuates improved resiliency as the system has access to more than one trusted CA issued server certificate configured on the system.

The various embodiments of the present invention may be applied to different scenarios. For example, a Merchant SDK may be distributed to various vendors with dynamic certificate pinning. Also, multiple valid pins configured against servers may prevent DOS until certificates are updated. Any system that mobile applications hit/access may implement certificate pinning. In addition, upgrades to dynamic certificate pinning framework may implement these features. An embodiment of the present invention is directed to configuring a server hosting the pins to have at least two different certificates issued by different CAs, at varying expiration dates and/or conditions.

According to an exemplary embodiment, dynamic certificate pinning may be applied to a Merchant SDK. In this application, the Merchant SDK may be bundled with two certificates. An intermediate certificate of CDN may host the certificates that the Merchant SDK may need to hit AUTH and gateway (GWO). A root CDN certificate may be used for a single time failover scenario. For the failover scenario, intermediates of AUTH/GWO may be bundled as well. In this example, the Merchant SDK may consume two frameworks: a Certificate Pinning Framework and a Sync Manager Framework. The Certificate Pinning Framework may manage the certificate pinning requirements on a network connection and validate if the connection is pinned against a valid certificate or not. The Sync Manger Framework may fetch the latest pins from CDN when requested by the Merchant SDK.

The Merchant SDK may load intermediate certificates (e.g., CDN, AUTH and GWO) from its bundle into a documents folder/certificates or other dedicated space within an app to persist the certificates. After the initial loading, the Merchant SDK may directly load from the documents folder/certificates and set into the Certificate Pinning Framework. The Merchant SDK may attempt a connection to AUTH and GWO in a BAU flow. If the Certificate Pinning Framework returns an error, a sync may be applied to connect to the CDN with the persisted Intermediate certificate of CDN that was previously set. If the connection to CDN succeeds, the latest pins of AUTH, GWO and CDN may be downloaded and the documents folder/certificates may be overwritten.

If the connection to CDN with the Intermediate CDN certificate fails, a failover scenario may be initiated to recover and prevent DOS. In accordance with an embodiment of the present invention, two different intermediate certificates for CDN with varying expiration times, offset by a predetermined time period (e.g., 6 months, etc.) may rotate the expired certificate so that there is enough lead time to replace the pin on CDN. In this example, the system may not need to failover to a root certificate and accordingly, a connection to CDN may be pinned to prevent interruption. In this scenario, when a fetch from CDN is successful and the pins within the SDK are overwritten, the system should have valid certificates so that a sync manager does not need to be called.

Figure 2:
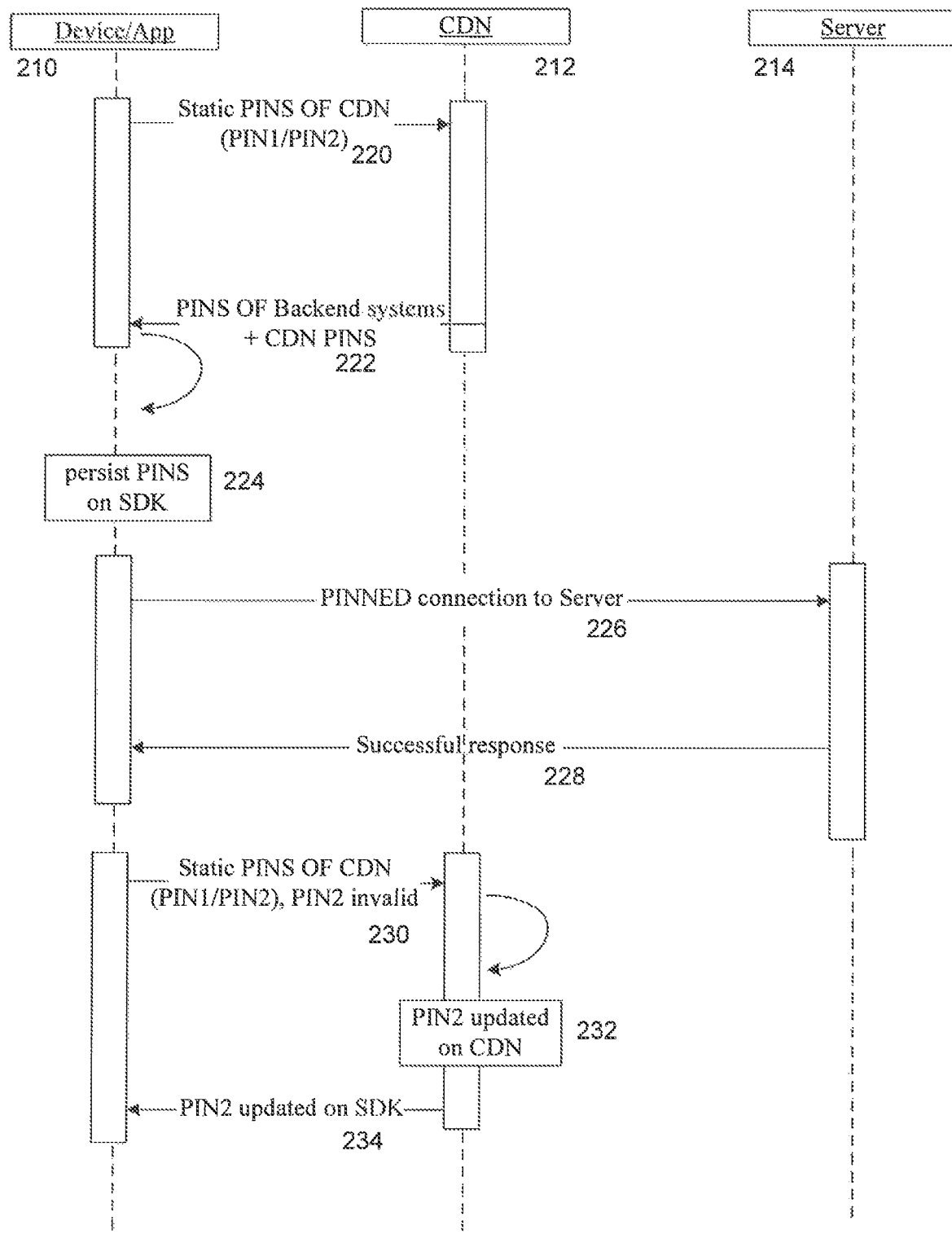
FIG. 2 is an exemplary dynamic certification pinning session, according to an embodiment of the present invention.

FIG. 2 is an exemplary dynamic certificate pinning approach, according to an embodiment of the present invention. As shown in FIG. 2, an embodiment of the present invention may configure servers with at least two pins obtained from different CAs with differing validity periods so that at any given time one of them is valid.

FIG. 2 illustrates interactions between and among Device 210, Content Delivery Network (CDN) 212 and Server 214. Device 210 may represent any mobile device, e.g., smart phone, tablet, computer, laptop, portable device, wearable, terminal, kiosk, etc. Device 210 may represent any client device that communicates with a server. Device 210 may execute an application ("app") or other software program. According to another example, Devices 210 may represent various consumer devices including IoT devices, smart home devices, speakers, personal assistant devices, wearables, smart vehicles, etc. Device 210 may represent a plurality of devices, network of devices, aggregated devices, etc. For example, a smart home may include multiple home devices, e.g., home security, appliances, furniture, electronics, personal assistant device, etc. that may communicate with a hub device. The hub device may then communicate with CDN 212 and Server 214. In this example, the hub device may further manage the certificates. Other scenarios and applications may be implemented in accordance with the embodiments of the present invention. Devices 210 may also represent any device that executes an application or other software program.

CDN 212 may represent a content delivery network or remote server that may be hosted by a service provider, third party, and/or other entity. For example, the application executing on the device and the CDN may be part of the same entity. In the example of FIG. 2, CDN 212 may manage pins and certificates. For example, CDN 212 may maintain a copy of some or all the certificates on behalf of the systems that the application is communicating with.

Server 214 may represent a gateway, a router, or a node in a computer network. For example, Server 214 may represent a payment gateway or other communication or transaction gateway or server. While FIG. 2 shows a single component for illustration, multiple components may be supported.

As shown in FIG. 2, Device 210 may request pins from CDN 212, at 220. In response, pins of backend systems and CDN pins may be transmitted to Device 210, as shown by 222. Pins may persist on Software Development Kit (SDK), at 224. A pinned connection to Server 214 may be established at 226. A response indicating success may be provided at 228 to Device 210. At 230, pin 2 may be determined to be invalid. Pin 2 may be updated on CDN 212, at 232. At 234, pin 2 may be updated on the SDK. As shown in FIG. 2, if a pin becomes invalid, a second valid pin may be used. The first pin may then be renewed or restored to a valid state. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
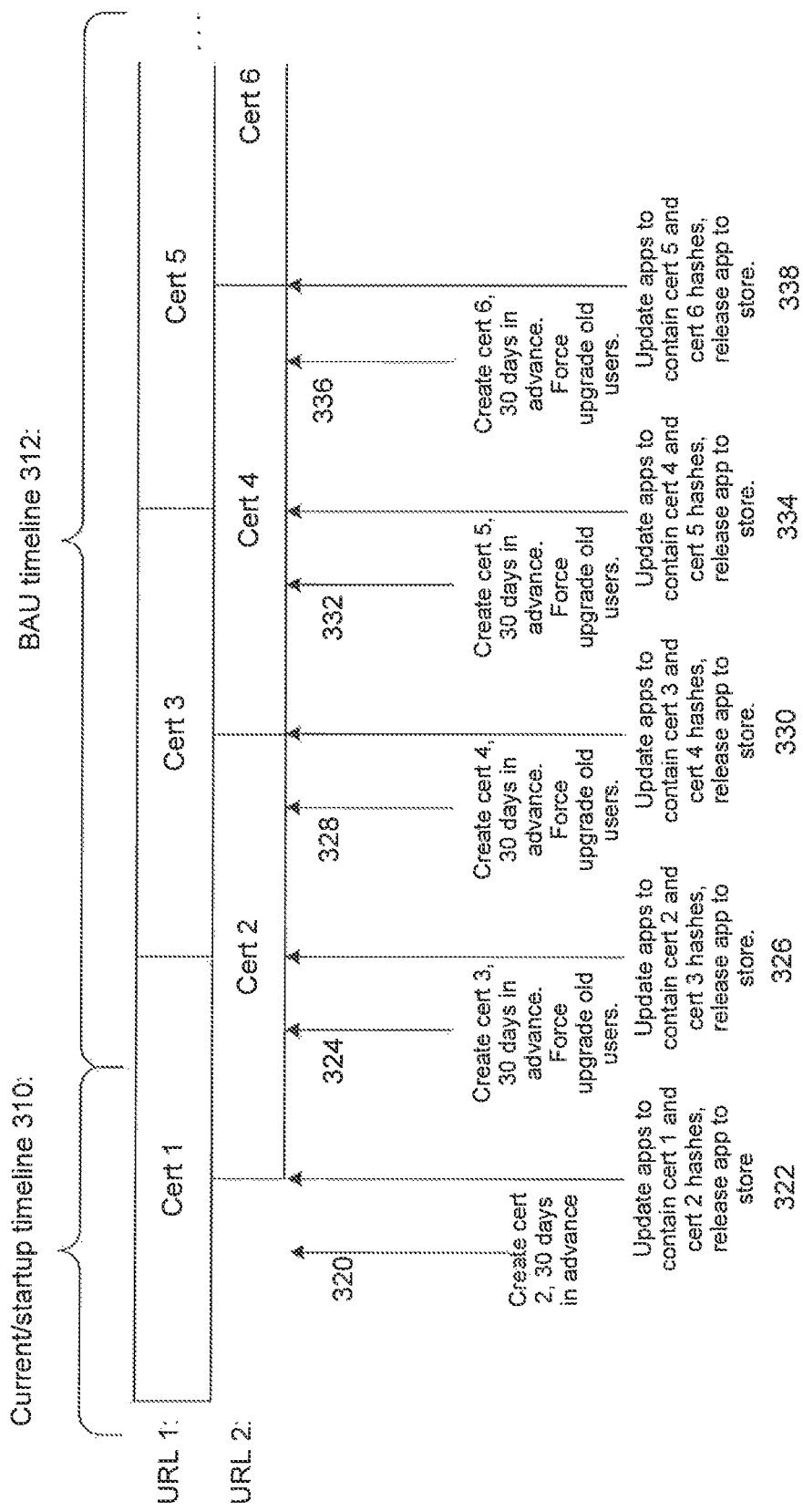
FIG. 3 is an exemplary multi-certificate pinning approach, according to an embodiment of the present invention.

FIG. 3 is an exemplary multi-certificate pinning approach, according to an embodiment of the present invention. Certificates (Certs) may be created at predetermined intervals, e.g., every 6 months, for 1 of 2 valid web service URLs, that are valid for a term, e.g., 1 year. Mobile apps may then pin the two currently valid certs. URL examples may include: mobile.bankABC.com and mobile-new.bankABC.com. The example of FIG. 3 shows two URLs. However, additional URLs may be applied in accordance with the embodiments of the present invention.

Certificate pinning may be performed at a leaf in order to provide protection against certificate authority (CA) compromise. For example, certificates may be chained. More specifically, certificates may be issued by a root CA, with multiple intermediaries. A leaf certificate may be an actual server certificate, issued to the particular server. For example, a leaf certificate may represent an end-entity or last certificate in a chain. An embodiment of the present invention may technically pin against any certificate within the chain. In this context, the lower in chain represents better security. Web traffic may continue to use the existing URLs as there is no certificate pinning impact.

In the example of FIG. 3, applications (apps) may try URL 1 first. If URL 1 fails, then apps may use URL 2. To avoid extra traffic, the app may store the latest successful URL and use it until it no longer works. FIG. 3 illustrates an example of two URLS. Other additional URLs may be implemented in accordance with the various embodiments of the present invention.

FIG. 3 illustrates Current/Startup timeline 310 and Business as Usual (BAU) timeline 312. For URL 1 and URL 2, a sequence of certificates may be applied in a manner that ensures business as usual operations. At 320, Cert 2 may be created. Cert 2 may be created a predetermined number of days in advance, e.g., 30 days in advance. At 322, applications may be updated to contain Cert 1 and Cert 2 hashes. Cert 3 may be created a predetermined number of days in advance, e.g., 30 days in advance. Prior to Cert 1 expiring, a forced upgrade may be applied at 324. Upon Cert 1 expiring, applications may be updated to contain Cert 2 and Cert 3 hashes, at 326. Cert 4 may be created a predetermined number of days in advance, e.g., 30 days in advance. Prior to Cert 2 expiring, a forced upgrade may be applied at 328.

Upon Cert 2 expiring, applications may be updated to contain Cert 3 and Cert 4 hashes, at 330.

Cert 5 may be created a predetermined number of days in advance, e.g., 30 days in advance. Prior to Cert 3 expiring, a forced upgrade may be applied at 332. Upon Cert 3 expiring, applications may be updated to contain Cert 4 and Cert 5 hashes, at 334. Cert 6 may be created a predetermined number of days in advance, e.g., 30 days in advance. Prior to Cert 5 expiring, a forced upgrade may be applied at 336. Upon Cert 5 expiring, applications may be updated to contain Cert 5 and Cert 6 hashes, at 338. The process may continue.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript, Objective-C, Swift, Kotlin and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression, obfuscation or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A mobile device that implements multi-certificate pinning, the mobile device comprising:
a memory component;
a network communication interface that is in communication with a remote server; and
a microprocessor, coupled to the memory component and the network communication interface, the microprocessor configured to perform the steps of:
requesting a first certificate having a first start date and a first expiration date and a second certificate having a second start date that is later than the first start date but before the first expiration date and a second expiration date that is later than the first expiration date from the remote server configured to maintain a plurality of certificates;
executing an application on the mobile device by using the first certificate to attempt a connection to the server and subsequently receiving a successful response from the server; and
prior to or upon an expiration of the first certificate, switching to the second certificate wherein the application now uses the second certificate to make the connection to the remote server.

2. The mobile device of claim 1, wherein the microprocessor is further configured to perform the step of:
renewing the first certificate to a valid state.

3. The mobile device of claim 1, wherein the microprocessor is further configured to perform the step of:
updating the application to contain a first certificate hash and a second certificate hash.

4. The mobile device of claim 1, wherein the microprocessor is further configured to perform the step of:
creating a third certificate in advance to the expiration of the first certificate.

5. The mobile device of claim 1, wherein the first certificate corresponds to a first URL.

6. The mobile device of claim 1, wherein the second certificate corresponds to a second URL.

7. The mobile device of claim 1, wherein the mobile device comprises an Internet of Things (IoT) device.

8. A mobile device that implements multi-certificate pinning, the mobile device comprising:
a memory component;
a network communication interface that is in communication with a remote server configured to maintain a plurality of certificates; and
a microprocessor, coupled to the memory component and the network communication interface, the microprocessor configured to perform the steps of:
requesting a first certificate having a first start date and a first expiration date;
receiving a second certificate having a second start date that is later than the first start date but before the first expiration date and a second expiration date that is later than the first expiration date in advance of an expiration of the first certificate;
updating at least one application executing on the mobile device to contain the first certificate and the second certificate;
receiving a third certificate in advance of the expiration of the first certificate; and
upon expiration of the first certificate; updating the at least one application executing on the mobile device to contain the second certificate and the third certificate.

9. The mobile device of claim 8, wherein the microprocessor is further configured to perform the step of:
renewing the first certificate to a valid state.

10. The mobile device of claim 8, wherein the microprocessor is further configured to perform the step of:
updating the application to contain a first certificate hash and a second certificate hash.

11. The mobile device of claim 8, wherein the microprocessor is further configured to perform the step of:
creating a fourth certificate in advance to the expiration of the first certificate.

12. The mobile device of claim 8, wherein the first certificate corresponds to a first URL.

13. The mobile device of claim 8, wherein the second certificate corresponds to a second URL.

14. The mobile device of claim 8, wherein the mobile device comprises an Internet of Things (IoT) device.

15. A method that implements multi-certificate pinning, the method comprising the steps of:
requesting a first certificate having a first start date and a first expiration date and a second certificate having a second start date that is later than the first start date but before the first expiration date and a second expiration date that is later than the first expiration date from a remote server configured to maintain a plurality of certificates;
executing an application on a mobile device by using the first certificate to attempt a connection to the server and subsequently receiving a successful response from the server; and
prior to or upon an expiration of the first certificate, switching to the second certificate wherein the application now uses the second certificate to make the connection to the remote server.

16. The method of claim 15, further comprising the step of:
renewing the first certificate to a valid state.

17. The method of claim 15, further comprising the step of:
updating the application to contain a first certificate hash and a second certificate hash.

18. The method of claim 15, further comprising the step of:
creating a third certificate in advance to the expiration of the first certificate.

19. The method of claim 15, wherein the first certificate corresponds to a first URL.

20. The method of claim 15, wherein the second certificate corresponds to a second URL.

* * * * *